United States Patent Office 2,765,669
Patented Oct. 9, 1956

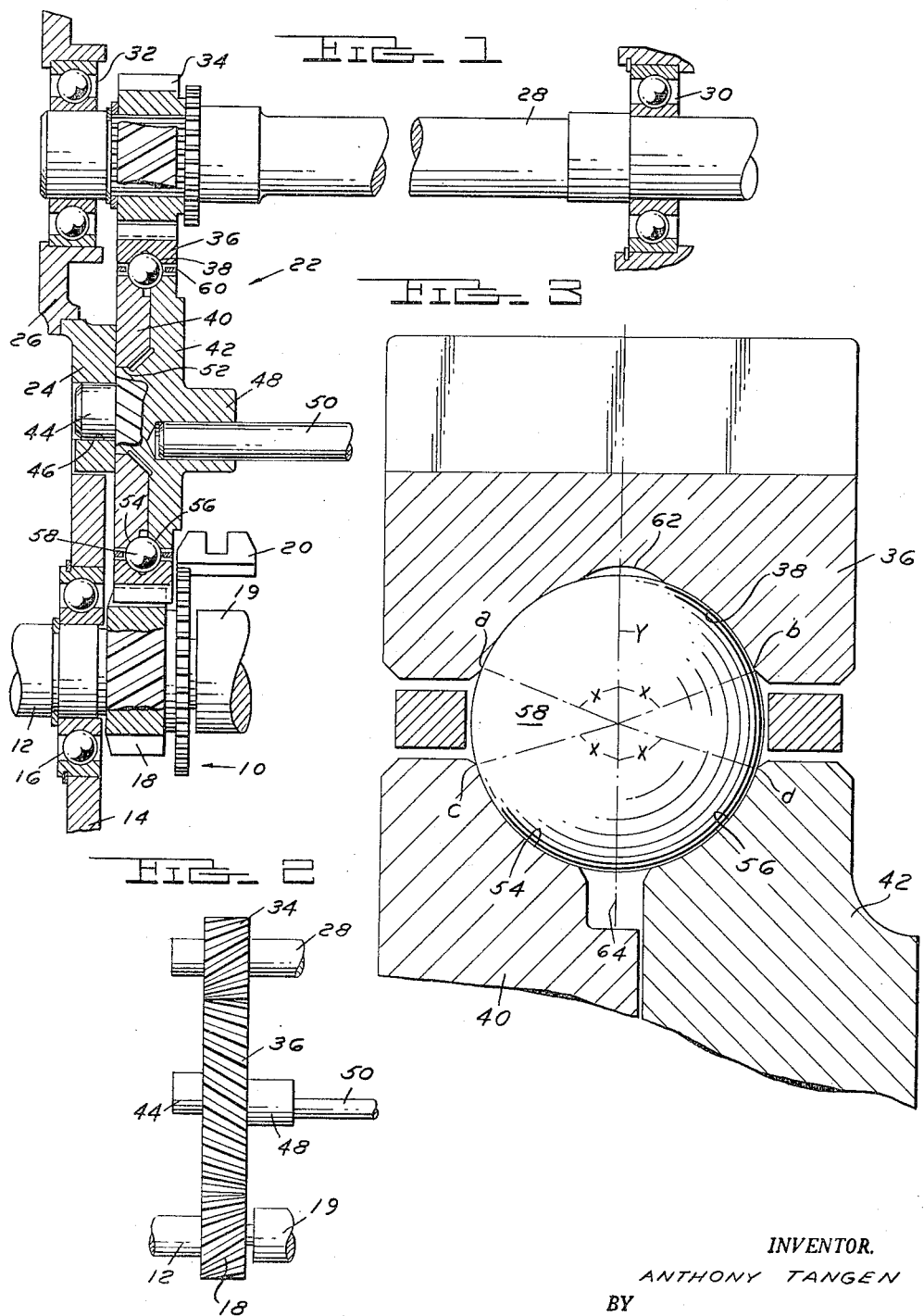

2,765,669

BEARING CONSTRUCTION FOR HELICAL GEAR TRANSMISSION

Anthony Tangen, Detroit, Mich.

Application April 8, 1955, Serial No. 500,196

14 Claims. (Cl. 74—421)

This invention relates to a bearing construction for a helical gear transmission.

In helical gear transmissions, it is often impossible to support one of the gears at spaced apart axial points; and therefore, the problem of supporting the gear so as to be capable to absorb a radial load as well as side thrusts becomes a difficult one. The use of a conventional ball bearing arrangement under such circumstances is not satisfactory because such bearings are not adapted to absorb side thrusts. The use of tapered thrust bearings offers a solution in some cases; but where the gear is subjected to thrust in opposite directions, the use of tapered thrust bearings is not usually feasible because opposed sets of such bearings must be employed and the space limitations will not usually admit the use of opposed sets of tapered thrust bearings.

It is an object of this invention to provide a bearing construction for a helical gear transmission which is admirably suited for absorbing both radial and thrust loads and which at the same time occupies no more space than the conventional ball bearing.

In the drawings:

Fig. 1 shows one form of helical gear transmission in which the bearing construction of this invention is employed.

Fig. 2 shows the three engaged helical gears of the transmission illustrated in Fig. 1.

Fig. 3 is an enlarged fragmentary sectional view of the bearing construction.

In order to illustrate a typical situation wherein the bearing construction of the present invention is admirably suited, the drawings show a portion of an automotive transmission employing helical gears and with a power take-off mounted on the transmission. The automotive transmission is generally designated by the numeral 10 and includes the main drive shaft 12 supported in the housing 14 of the transmission by a ball bearing 16. Within the housing 14, shaft 12 supports a helical drive gear 18. A conventional gear shifter collar 20 is supported for sliding movement on transmission jack shaft 19 which is journalled within the end of drive shaft 12.

In connecting a power take-off with this transmission, the gear 18 is utilized for driving the power take-off. The power take-off is generally designated by the numeral 22 and includes a housing 24 provided with an aperture at one end closed by an end cap 26. The power shaft 28 of the power take-off is supported at axially spaced points by ball bearings 30 and 32. The shaft 28 fixedly supports a helical gear 34 which is driven by gear 18 on shaft 12 through an intermediate idler gear 36. Gear 36 is also fashioned as a helical gear and is in the form of an annulus fashioned with a ball bearing race 38 around its inner periphery. The gear 36 is supported by a hub structure comprising a pair of members 40 and 42. The member 40 is fashioned with a boss 44 press fitted into a socket 46 formed in housing 24. Member 42 is fashioned with a boss 48 provided with sockets into which one end of the gear shifter rails 50 are seated.

Member 42 is also fashioned with a shoulder 52 on which the member 40 is seated. Screws or the like not shown are employed for holding the members 40 and 42 in assembled relation as shown.

The members 40 and 42 are fashioned with race portions 54, 56, respectively. Ball bearings 58 are interposed between the race 38 and races 54, 56. An annular ball spacer 60 is employed for holding the balls 58 in regularly spaced relation.

In this arrangement, it will be observed that in view of the fact that the gear 36 is engaged by helical gears at diametrically opposite points, a side thrust will be imparted to the gear 36 in one direction at its point of interengagement with gear 18 and a side thrust in the opposite direction will be applied to the gear 36 at its point of interengagement with the gear 34. The bearing construction of this invention is designed to withstand both the radial load on gear 36 as well as these side thrusts in opposite directions. This is accomplished by forming the races in the respective members so that they extend around the balls 58 a much greater extent than is the case with conventional ball bearings.

Referring to Fig. 3, it will be noted, for example, that the race 38 extends around the ball 58 from the point $a$ to the point $b$. Likewise, on the members 40 and 42, the races 54, 56 extend around the opposite side of balls 58 from the point $c$ to the point $d$. The angles $x$ formed between these edges of the races and the medial plane $y$ of the gear 36 in the arrangement illustrated is in the neighborhood of 70°. As is conventional in ball bearing constructions, the radius of the ball races is slightly greater than the radius of the balls. This difference in radius may be in the neighborhood of ten thousandths of an inch and is therefore not illustrated in the drawings. It accounts for the fact, however, that under loaded conditions, the balls 58 roll with substantially line contact around the arcuate races. With this bearing construction, the races should be designed to extend around the balls sufficiently beyond the theoretical line of contact calculated for the particular loading of the arrangement contemplated so that the locus of bearing between the balls and the races is not too close to the edge of the races. In applications of this type, it is more than likely that the line of contact between the balls and the races might approach an angle of about 40° from the medial plane of the gear; and therefore, I prefer to hold the minimum extent to which the races extend around the balls to an angle of at least 45° of the medial plane of the races. Where the side thrust is more severe, the races should be extended around the balls a greater extent, say, for example 70 or 80°.

In assembly, the balls 58 are first arranged in the race 38 with the spacer 60 holding the balls in their regularly spaced positions. Thereafter, the members 40 and 42 are drawn inwardly from opposite sides of the gear 36 to engage the balls as illustrated; and these members are secured together to provide an integral supporting unit for the annular gear 36. It will be observed that race 38 is formed with a groove 62 and races 54 and 56 are fashioned to provide a diametrically offset groove. These grooves are provided in the respective races not only to simplify the grinding of these races, but also to provide an oil channel around the races for affording proper lubrication to the races and the balls.

Thus, it will be seen that I have provided a ball bearing construction admirably suited for use in a train of helical gears wherein at least one of the gears is subjected to side thrust. This ball bearing race construction is designed to withstand severe side thrusts and at the same time does not occupy any more space than a conventional ball bearing construction.

I claim:
1. In a helical gear transmission, a helical gear comprising an annular member provided with helically disposed tooth portions around its periphery, a fixedly mounted supporting member for said gear, said gear and said supporting member having opposed peripheral faces, said faces being formed with ball races, ball bearings in said races whereby the gear is journalled for rotation on said supporting member, said races extending circumferentially around said balls through an angle of at least 45° at each side of the medial plane of the gear whereby said balls and races are adapted to withstand substantial side thrust imparted to said gear.

2. The combination called for in claim 1 wherein said supporting member is disposed concentrically within said annular gear, one of said bearing races being fashioned around the inner periphery of the gear and the other bearing race being fashioned around the outer peripheral surface of said supporting member.

3. The combination called for in claim 2 including an annular member disposed between said opposed annular faces of said gear and supporting member and engaging said ball bearings to hold them in circumferentially spaced apart relation.

4. The combination called for in claim 3 wherein said gear is an idler gear.

5. In a gear train, a pair of engaged helical gears, one of said gears comprising an annular member having helically disposed tooth portions around the periphery thereof, a support for said last mentioned gears comprising a pair of members secured together into an integral unit, said gear and said support member having opposed peripheral faces, said faces being formed with ball races, ball bearings in said races whereby the gear is journalled for rotation on said support, said races extending circumferentially around said balls through an angle of at least 45° at each side of the medial plane of said gear, said support members being separable to permit assembly of said balls with said races.

6. The combination called for in claim 5 wherein said races are each provided with circumferential grooves at the axial central plane thereof.

7. The combination called for in claim 5 wherein said members are movable axially of said gear to separate them one from another.

8. The combination called for in claim 7 wherein said members are fashioned with opposed faces which are generally parallel to the medial plane of said gear and intersect the race formed on said support along a line spaced adjacent the medial plane of said gear.

9. In a gear train, a series of at least three helical gears, one of said gears being an idler gear for transferring the driving torque from another of said gears to the third gear, said idler gear comprising an annular member having inner and outer peripheral surfaces, helically disposed tooth portions around one of said peripheral surfaces and a bearing race formed in the other peripheral surface, a support for said idler gear comprising a pair of separable members secured together to form an integral unit, said support having a peripheral face extending concentrically around the bearing race on said idler gear, a second bearing race fashioned in said last mentioned peripheral surface, a plurality of ball bearings disposed in said races, said races extending circumferentially around said balls through an angle of at least 45° at each side of the medial plane of said idler gear.

10. The combination called for in claim 9 wherein said two members forming said support are fashioned with opposed faces which intersect the ball race formed on said support and are relatively movable in an axial direction for separation.

11. The combination called for in claim 9 wherein one of said members is formed with an axially extending shoulder and the other member is fashioned with an axially extending opening interengaged with said shoulder whereby to position said members in radially fixed relation relative to one another.

12. The combination called for in claim 9 wherein said idler gear is arranged concentrically around said support member, said races being formed respectively on the inner periphery of the idler gear and the outer periphery of said support member.

13. The combination called for in claim 9 wherein said race on said support is formed in part on each of said members, and means defining a circumferentially extending groove between the portions of said race on said two members.

14. The combination called for in claim 9 wherein each of said races is fashioned with a circumferentially extending oil groove at the axial central plane of said races.

No references cited.